March 23, 1943.  G. H. BROWN  2,314,764
ULTRA HIGH FREQUENCY WATTMETER
Filed April 26, 1941
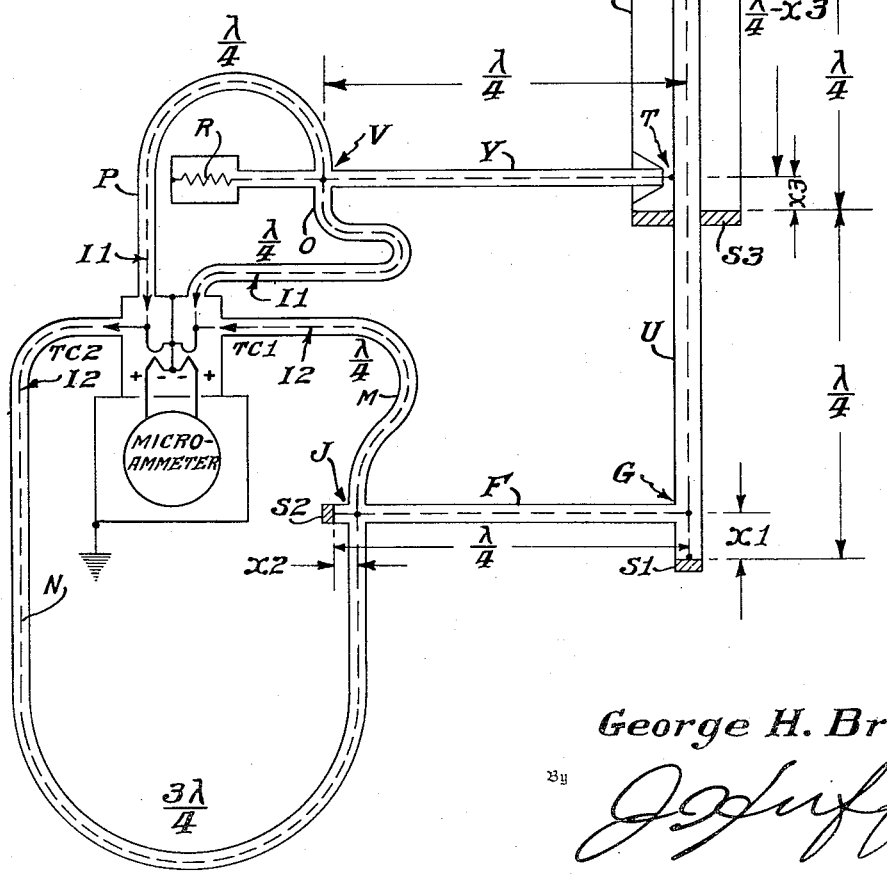
Inventor
George H. Brown
By
Attorney Patented Mar. 23, 1943

2,314,764

UNITED STATES PATENT OFFICE 2,314,764

ULTRA HIGH FREQUENCY WATTMETER

George H. Brown, Haddonfield, N. J., assignor to Radio Corporation of America, a corporation of Delaware Application April 26, 1941, Serial No. 390,627

8 Claims. (Cl. 171—95)

This invention relates to an improved ultra high frequency wattmeter and particularly to an ultra high radio frequency wattmeter in which the operating power is negligible and in which accuracy is obtained in the range of frequencies for which the device is designed.

One of the objects of the invention is the provision of improved means for measuring ultra high radio frequency power. Another object is to provide means for measuring ultra high frequency power applied to a load without absorbing an appreciable amount of said power in the measuring means. An additional object is to provide means whereby an ultra high radio frequency wattmeter may be adjusted for power measurements. A further object is to provide means for measuring power into reactive loads at ultra high radio frequencies.

The invention will be described by referring to the accompanying drawing in which Figure 1 is a schematic diagram of thermocouples and a meter which are used in a portion of the device; Figure 2 is a schematic diagram of one embodiment of the invention; Figure 3 is a schematic diagram of a terminated transmission line.

Referring to Figure 1, a pair of thermocouples TC1 and TC2 are connected to a microammeter and between a power source and a load to which power is applied. The currents in the circuit may be traced as follows:

The current through the heater of TC1 is $I1+I2$ and the current through the heater of TC2 is $I1-I2$. The output current of a thermocouple is $D=kI^2$, where D is the deflection of the microammeter and I is the heater current. Suppose $I1 \alpha EL$ and $I2 \alpha IL$, respectively, are in phase with the voltage EL and the current IL. EL is the voltage across the transmission line at point L and IL is the line current at the same point. Let D1 be deflection from TC1 and D2 be deflection from TC2.

$$D1 = k|I1+I2|^2 \quad (1)$$
$$D2 = k|I1-I2|^2$$

Suppose the line current IL leads the line voltage EL by $\theta$ degrees. Equations 1 and 2 become $$D1 = k|I1+I2 \ (\cos \theta + j \sin \theta)|^2 \quad (3)$$
$$D2 = k|I1-I2 \ (\cos \theta + j \sin \theta)|^2 \quad (4)$$

Since the couples are connected with the outputs in opposition $$D = D1 - D2$$
$$= 4kI1I2 \cos \theta \quad (5)$$

Therefore, the microammeter deflection is directly proportional to power and takes proper account of phase angle.

The two thermocouples used should be identical. That is, with the same heater currents they should cause equal currents through the microammeter when connected individually. If the thermocouples are unlike, the junction of the one causing the higher current can be shunted with a resistor to make the output currents equal. Also, the heaters must be insulated from the junctions. By way of example, vacuum couples having a maximum allowable heater current of one ampere were used. The microammeter used had a full scale deflection of 200 microamperes and a meter resistance of 8.0 ohms.

The currents I1 and I2 were obtained with concentric lines in the manner illustrated in Fig. 2, to which reference is now made. The transmission line passing point L was enlarged to facilitate mechanical construction. The enlarged section was designed so that its characteristic impedance is the same as the transmission line connecting the power source and the load. A half wave section of ⅞" transmission line U was connected in series with the inner conductor of line H—H'. A shorting plug at S1 a half wave from line H—H' made the series impedance between H and H' very low; zero, if there were no losses in the line. The outer conductor of line U comprises the inner conductor of line C which is shorted at S3 a quarter wave from L. Thus, line C places a very high impedance across line H—Y'. For all other lines conventional ⅜" transmission lines of the indicated lengths are suitable.

The velocity of propagation $v$ was taken into account in calculating line lengths. Where $v_0$ is the velocity and $\lambda_0$ the wave length in free space, the physical length to which the line is cut is $$\lambda = \frac{v}{v_0} \lambda_0$$

The thermocouples were mounted in a block of metal and the microammeter was enclosed in a metal case, as shown, to eliminate undesired R.-F. currents which might endanger the junctions of the couples.

The mode of operation may be determined after analyzing mathematically a transmission line such as shown in Figure 3. In a transmission line, the current $Ix$ and voltage $Ex$, distributions along a transmission line, Fig. 3, with negligible losses are:

$$Ix = Io \cos \frac{2\pi x}{\lambda} + \frac{Eo}{Zc} j \sin \frac{2\pi x}{\lambda} \qquad (6)$$

$$Ex = Eo \cos \frac{2\pi x}{\lambda} + jIoZc \sin \frac{2\pi x}{\lambda} \qquad (7)$$

$Zc$ is the characteristic impedance of the line. $2\pi x/\lambda$ is in radians, $\lambda$ is a wave length of line in the units of the distance $x$.

If $Zo=0$ as for lines C, U, F, M, N, O and P, $$Ix = Io \cos \frac{2\pi x}{\lambda} \qquad (8)$$

$$Ex = jIoZc \sin \frac{2\pi x}{\lambda} \qquad (9)$$

If $Zo=Zc$ as for line, $\lambda$ $$Ix = Io\left(\cos \frac{2\pi x}{\lambda} + j \sin \frac{2\pi x}{\lambda}\right) \qquad (10)$$

$$Ex = Eo\left(\cos \frac{2\pi x}{\lambda} + j \sin \frac{2\pi x}{\lambda}\right) \qquad (11)$$

In examining phase relations and voltage and current magnitudes, it should be observed that lines F, M, N, O and P place very high impedances across lines at points G, J and V because F, M, N, O and P are quarter or odd multiples of quarter wave lengths terminated in short circuits.

While it is practical to determine mathematically the derivation of the thermocouple currents, it may be stated as follows: Since the line U is a half wave long and is shorted at its far end S1, it acts as a very low impedance in the transmission line H—Y'. The line C is a quarter wave long, is shortened at S3, and is a high impedance across the transmission line H—H'. The line $\gamma$ is an arbitrary length, preferably greater than a quarter wave as shown, and is terminated by a resistance R equal to its characteristic impedance $Zc$. If the line $\gamma$ is connected at a point T, which is a short distance X3 from the shorting plug S3, the power taken may be made negligibly small. Furthermore, the current I1, after passing through the proper lengths of lines, will be in phase with the voltage of the line H—Y'. At the point V, which is a quarter wave along the line $\gamma$ from T, a pair of quarter wave lines O and P are connected. These lines terminate in the heaters of the thermocouples TC1 and TC2 and apply thereto the current I1, which is really a sample of the voltage at L and is in phase with that voltage.

The other branch of the circuit for deriving the current I2, which is a sample of the current IL and is in phase with that current, is arranged as follows: While the lines M and N may be connected directly to the point G at a distance X1 from the shorting plug S1 on line U, for mechanical reasons it may be preferable to first connect a quarter wave line F to the point G. The distance X1 may be made great and only small amount of power is taken because the voltage is applied to a high impedance line. At an appropriate distance X2 along line F from its shorting plug S2 are connected at point J a quarter wave line M and a three-quarter wave line N. These lines terminate in the heaters of the thermocouples TC1 and TC2 and apply thereto the current I2. Furthermore, the current I2 will be proportional to the current in the transmission line H—H'.

Since the lines O and P are each a quarter wave long and since the lines M and N differ by a half wave length, it may be demonstrated: (1) that the currents I1 and I2 which are applied to the first thermocouple TC1 are equal to the sum of the currents $(I1+I2)$, and (2) that the currents I1 and I2 which are applied to the second thermocouple are equal to the difference of the currents $(I1-I2)$. It was shown above that this relationship of the sum $(I1+I2)$ and difference $(I1-I2)$ of the currents is what was sought for a wattmeter.

It should be understood that the smaller the dimensions of X3, the smaller is the power required by the wattmeter. Therefore, in a meter designed for high power, X3 must be made small. Furthermore, just as an additional quarter wave line F was connected at point G, so may other lines be connected at points T or J.

The wattmeter may be calibrated by applying known loads at known frequencies. For example, if 1000 watts are applied to a 70-ohm line, and the meter is designed for 2000 watts full scale deflection, the line voltage will be $$EL = \sqrt{PR} = \sqrt{1000 \times 70} = 264$$

and the line current will be $$IL = \frac{EL}{R} = \frac{264}{70} = 3.78 \text{ amperes}$$

If the currents I1 and I2 are made equal for a 70-ohm load, $$I1 I2 = \frac{D}{4k}$$

from Equation 5 so $$I1 = I2 = \sqrt{\frac{D}{4k}} = \sqrt{\frac{1000}{4 \times 12250}} = 0.143 \text{ ampere}$$

The coefficient $k$ is that obtained with the microammeter across both junctions. For convenience, data on the couples may be obtained at 60 cycles. Now the tapping positions should be adjusted so a current of 0.143 ampere is produced through one couple by either an EL of 264 volts or an IL of 3.78 amperes acting alone. After adjusting X1, X2 and X3 to calculated values, make I2 zero by disconnecting line F at point G. Voltage equal to EL can be measured a half wave back along the transmission line from point L. If EL is made 264 volts, D should be 330, for a heater current $I1=0.143$ ampere. Since the currents in both couples should be equal and opposing, the microammeter must be placed across either junction alone. Move tapping point T to adjust the deflection to 330.

Reconnect line F. Make I1 zero by disconnecting lines O and P at point V. With a shorting plug at B, measure voltage E a quarter wave back along the transmission line from point L. The current at L is $$IL = \frac{E}{70}$$

and should be made 3.78 amperes. Again D for each couple should be 330. Move tapping point J or G to adjust the deflection to 330. When such a calibration was made, it was found necessary to make a slight adjustment in the length of M or N to make the couples show equal deflections. Now the wattmeter should show full scale deflection for a 2000-watt load when connected normally. The load need not necessarily be 70 ohms. It should be understood that a quarter wave line may be made three quarters of a wave length or any odd integer, and likewise a half wave line may be made a full wave length or any integral number of half waves. Furthermore, the voltage and current sampling lines may be reversed after the points T and G have been properly established.

I claim as my invention:

1. An ultra high frequency meter for measuring the power applied through a transmission line to a load including in combination a second transmission line connected to any one point on said first line for deriving a current proportional to the load current flowing through said first transmission line and for applying a low impedance at said connection, means including said second transmission line and a third transmission line for deriving a current proportional to the voltage of said first line, and means for indicating the power applied to said load as functions of said two derived currents.

2. An ultra high frequency meter for measuring the power applied through a transmission line to a load including in combination a second transmission line connected to any one point on said first line for deriving a current proportional to the load current flowing through said first transmission line and for applying a low impedance at said connection, means including said second transmission line and a third transmission line for deriving a current proportional to the voltage of said first line, and means for indicating the power applied to said load as a function of the sum and the difference of said two derived currents.

3. An ultra high frequency meter for measuring the power applied through a transmission line to a load including in combination a second transmission line serially connected to any one point on said first line for deriving a current proportional to the load current flowing through said first line and for applying a low impedance across the serial connection points, means including at least a portion of said second transmission line and a third transmission line for deriving a current proportional to the voltage of said first line, and means for indicating the power applied to said load as a function of the sum and difference of the derived currents.

4. An ultra high frequency meter for measuring the power applied through a transmission line to a load including in combination a second transmission line connected to any one point on said first line for deriving a current proportional to the load current flowing through said first transmission line and for applying a low impedance at said connection, means including said second transmission line and a third transmission line for deriving a current proportional to the voltage of said first line, a pair of thermocouples connected to said current deriving transmission lines, and a meter connected to said thermocouples for indicating the power applied to said load as a function of the sum and difference of the two derived currents.

5. An ultra high frequency wattmeter including in combination a half wave transmission line for deriving a current proportional to the current applied to the load in which the power is to be measured and for applying a low impedance at the points through which said applied current flows and said proportional current is derived, an electrical network including a quarter wave line connected to said half wave line for deriving a current proportional to the voltage applied to said load, and means for indicating the power applied to said load as functions of said derived currents.

6. An ultra high frequency wattmeter including in combination a half wave transmission line for deriving a current proportional to the current applied to the load in which the power is to be measured, means short-circuiting the far terminals of said half wave line, a quarter wave transmission line including a portion of said half wave line, means short-circuiting the far end of said quarter wave line, a matched transmission line connected to a point on said quarter wave line to derive therefrom a current proportional to the voltage applied to said load, a pair of transmission lines of lengths differing by a half wave length connected to a point intermediate the ends of said half wave line for deriving currents proportional to the current across said load, and means for indicating said power as a function of the sum and difference of the said derived currents.

7. An ultra high frequency wattmeter including in combination a half wave transmission line for deriving a current proportional to the current applied to the load in which the power is to be measured, means short-circuiting the far terminals of said half wave line, a quarter wave transmission line including a portion of said half wave line, means short-circuiting the far end of said quarter wave line, a matched transmission line connected to a point on said quarter wave line, a pair of quarter wave lines connected at a point one quarter wave from the point at which said matched line is connected to said quarter wave line to derive therefrom a current proportional to the voltage applied to said load, a pair of transmission lines of lengths differing by a half wave length connected to a point intermediate the ends of said half wave line for deriving currents proportional to the current across said load, and means for indicating said power as a function of the sum and difference of the said derived currents.

8. An ultra high frequency meter for measuring the power applied to a load including, in combination, a transmission line connected to said load for deriving a current proportional to the load current and for applying a low impedance to said connection, means including said transmission line and a second transmission line for deriving a current proportional to the voltage across said load, and means for indicating the power applied to said load as functions of said two derived currents.

GEORGE H. BROWN.